(12) United States Patent
Schlicher

(10) Patent No.: US 10,326,771 B2
(45) Date of Patent: Jun. 18, 2019

(54) SECURE FILE TRANSACTION SYSTEM

(71) Applicant: Sherpas Cyber Security Group, Inc., Montgomery Village, MD (US)

(72) Inventor: Bob Schlicher, Knoxville, TN (US)

(73) Assignee: Sherpas Cyber Security Group, Inc., Gaithersburg, MD (US)

( * ) Notice: Subject to any disclaimer, the term of this patent is extended or adjusted under 35 U.S.C. 154(b) by 0 days.

(21) Appl. No.: 16/163,699

(22) Filed: Oct. 18, 2018

(65) Prior Publication Data

US 2019/0124089 A1 Apr. 25, 2019

Related U.S. Application Data

(60) Provisional application No. 62/574,475, filed on Oct. 19, 2017.

(51) Int. Cl.
*H04L 29/06* (2006.01)

(52) U.S. Cl.
CPC ........ *H04L 63/102* (2013.01); *H04L 63/0853* (2013.01); *H04L 63/108* (2013.01); *H04L 63/08* (2013.01); *H04L 63/10* (2013.01)

(58) Field of Classification Search
CPC . H04L 63/102; H04L 63/0853; H04L 63/108; H04L 63/10; H04L 63/08
See application file for complete search history.

(56) References Cited

U.S. PATENT DOCUMENTS

| | | | | |
|---|---|---|---|---|
| 6,098,056 | A * | 8/2000 | Rusnak | G06Q 20/3821 705/75 |
| 6,356,941 | B1 * | 3/2002 | Cohen | G06F 21/6272 709/219 |
| 7,526,516 | B1 * | 4/2009 | Pavlyushchik | G06F 21/554 |
| 8,327,450 | B2 | 12/2012 | Clement et al. | |
| 8,959,579 | B2 | 2/2015 | Barton et al. | |
| 9,336,366 | B2 | 5/2016 | Raley et al. | |
| 9,443,112 | B2 | 9/2016 | Kurian | |
| 9,467,475 | B2 | 10/2016 | Faltyn et al. | |
| 9,705,865 | B2 | 7/2017 | Slaton et al. | |
| 9,747,438 | B2 | 8/2017 | Fojtik et al. | |
| 9,760,697 | B1 | 9/2017 | Walker | |
| 9,824,194 | B2 * | 11/2017 | Balasubramanian | G06F 21/10 |
| 2004/0193885 | A1 * | 9/2004 | Fisk | G06F 17/3089 713/175 |
| 2009/0025090 | A1 * | 1/2009 | Clement | G07C 9/00103 726/28 |
| 2014/0189808 | A1 * | 7/2014 | Mahaffey | H04L 63/083 726/4 |

(Continued)

OTHER PUBLICATIONS

New FinalCode 5.3 Release Extends the Types of Applications Traditional IRM Can Support Publication info: ICT Monitor Worldwide [Amman] Sep. 13, 2017, SyndiGate Media Inc , US.

*Primary Examiner* — Ayoub Alata
(74) *Attorney, Agent, or Firm* — Williams Mullen; Thomas F. Bergert

(57) ABSTRACT

Embodiments of a secure file transaction system employ a host to receive a file manipulation request for a secure file from a requester, determine whether the requester is authorized for the file manipulation request, issue an authentication challenge to the requester, issue an approval request to the file owner and process the file manipulation request based upon obtained authentication and approval.

20 Claims, 7 Drawing Sheets

(56) References Cited

U.S. PATENT DOCUMENTS

| | | | |
|---|---|---|---|
| 2015/0074830 A1* | 3/2015 | Raley | G06F 21/10 |
| | | | 726/28 |
| 2016/0359859 A1 | 12/2016 | Capone | |
| 2017/0098071 A1 | 4/2017 | Stopel et al. | |
| 2017/0124320 A1 | 5/2017 | Fojtik et al. | |

* cited by examiner

SECURE FILE TRANSACTION SYSTEM

CROSS-REFERENCE TO RELATED APPLICATIONS

The present application claims priority to U.S. provisional application No. 62/574,475, filed Oct. 19, 2017, entitled, "System, Apparatus and Method for Secure File Transactions".

TECHNICAL FIELD

The present disclosure pertains to cybersecurity and, more specifically, to a system, apparatus and method for preventing unauthorized actions with electronic data and/or files.

BACKGROUND AND SUMMARY

The cyber world is a dangerous place. No matter how many layers of security solutions are implemented, organizations and their networks are still vulnerable. A targeted attack can breach purportedly secure networks and steal the data contained therein. The most sophisticated cyber security authentication tools are generally only used to challenge users at the login phase. Further, data vaults for storing critical information and files are generally provided with access doors, which expose files and/or data stored in the data vaults to unauthorized file manipulation activities by unscrupulous actors.

In various embodiments, the system of the present disclosure analyzes a user's network behavior after the login stage and automatically sends authentication challenges to an associated device when anomalous behavior is detected. Further, anomalous behavior can be presumed by the present system, such that requested access is anticipated to be denied subject to a proper authentication permitting highly temporary and personal file access. In various embodiments, authentication is required by the requester and by one or more designated file owners.

Aspects of the present disclosure relate to a data vault with no doors or exits, thereby better securing stored data from any kind of exfiltration attempt, either by insiders or outsiders. In various embodiments, the presently disclosed system provides a secured container for infrastructure, software, workstation, platform, and storage "as-a-service" capabilities. The container blocks all exits by default and specifically protects against the theft or unauthorized exfiltration of data stored therein. As such, the present system provides far superior and secure data vault operations.

In various embodiments, the system can detect exfiltration attempts, identify anomalous or unauthorized actions, and block them. Aspects of the present disclosure provide and/or employ a mobile communications device application incorporating adaptive multi-factor authentication to validate users for their actions by challenging them to provide multiple distinct pieces of evidence. Further, the system disclosed herein automatically detects bad network behavior and prevents all data transfers until the user passes authentication challenges and, in various embodiments, until the requested file manipulation is approved by one or more designated owners.

DETAILED DESCRIPTION

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

It will be appreciated that reference to "a", "an" or other indefinite article in the present disclosure encompasses one or more than one of the described element. Thus, for example, reference to a processor may encompass one or more processors, a file owner may encompass one or more file owners, and so forth.

It will further be appreciated that terms such as "data", "file" and "data file" as used herein encompass electronically stored information or data, regardless of format or file type.

Figure 1:
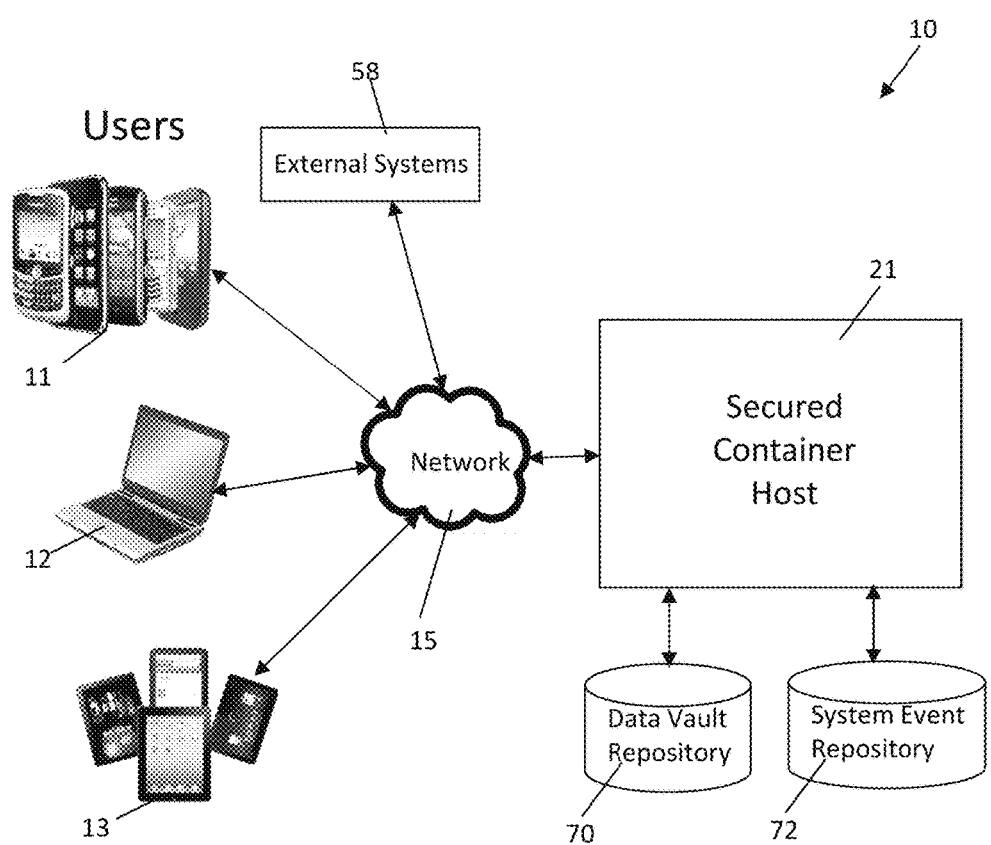
FIG. 1 is a schematic architectural diagram illustrating a system in accordance with aspects of the present disclosure.

In accordance with the present disclosure, FIG. 1 shows an exemplary system 10 having various components that facilitate secure file activities within a network. Various users of the present invention can access and implement functions provided by the system 10 using devices, such as mobile communications devices 11, laptop and other similar computing devices 12 and tablet computing devices 13, for example. While such devices 11, 12 and 13 are shown in FIG. 1, it will be appreciated that desktop computers and other computing devices not shown can be employed with the system disclosed herein. The users can employ such devices to access and implement functions provided by the system of the present invention using network 15, which can be a public network such as the Internet, for example, or a non-public network.

The system 10 can be embodied as a secured container host 21 that protects a networked plethora of computing assets and digital data storages. Data files can be copied into the data vault repository 70 and can remain contained inside the repository 70 until an authorized, authenticated, and structured outbound file transfer is executed as described herein. In various embodiments, each file is assigned to one or more specific user accounts by the host, and the host enforces that the owner, i.e., a specific user or users, maintains control of the file. For instance, a company's customer list may exist as a text file, and the company's officers may be identified as the owners. Actions involving the change or movement of a file require the authentication or authorization from the owner. This is achieved by engaging the owner through authentication channels. The present disclosure increases these channels through an event-based authentication subsystem. Further, the system operates such that even valid and properly authenticated access is momentary in nature. For example, the data vault repository is opened and then quickly closed automatically, and does not become open again until actively re-opened by the user. In various embodiments, the data vault is opened for one transaction cycle and then closed.

Figure 2:
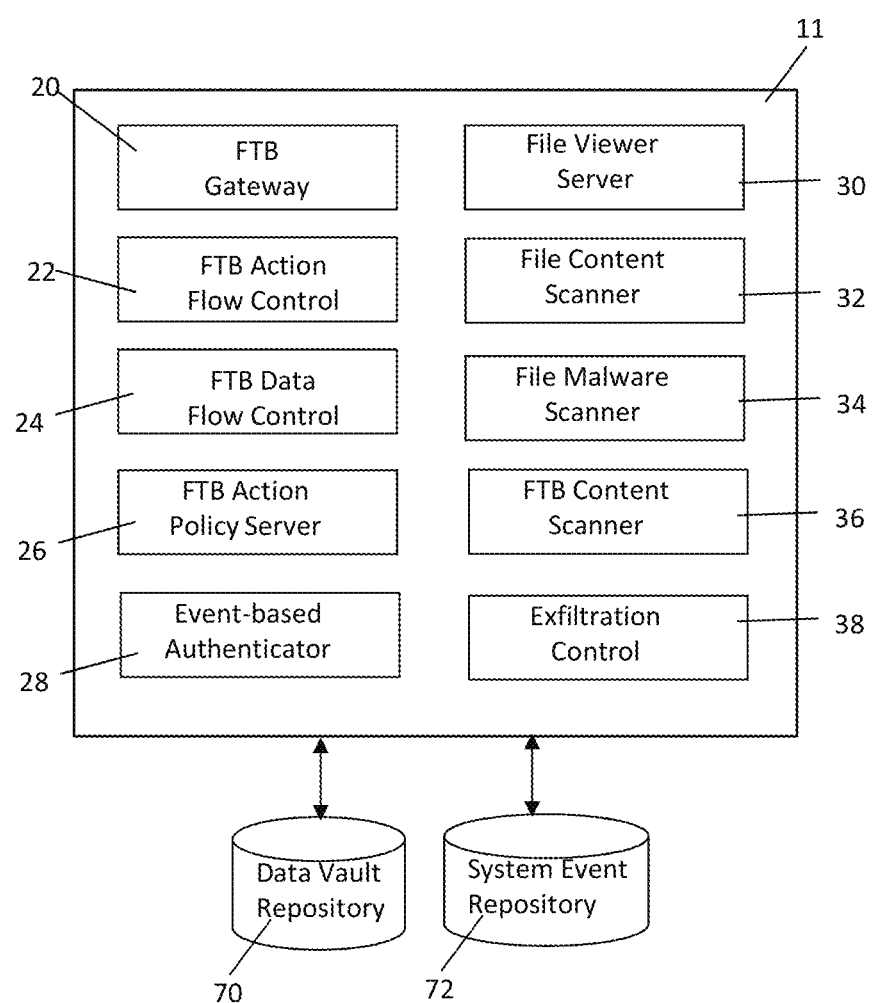
FIGS. 2 and 3 are exemplary schematic diagrams of system components in accordance with aspects of the present disclosure.

FIG. 2 provides a diagram of one embodiment of the host 21 disclosed herein, with various subsystems and/or components 20-38. A file transfer blocker (FTB) gateway subsystem 20 defines the operating boundaries and controls the network access to the inside networked components. An FTB action flow control subsystem 22 controls the flow of actions within and among the networked components. An FTB data flow control subsystem 24 controls the flow of data within the networked components. An FTB action policy server subsystem 26 determines authorized actions per user role, system, and time-base, for example. Authorized actions can be further evaluated based on the determined geolocation of a user's mobile device, for example. In the example of the company customer list above, all company officers may have authority to allow a requester to view the company customer list, but the president of the company may be the only officer with the authority to allow the customer list to be copied and/or transferred to another party outside of the secured container host 21, for example. Further, the authority can be restricted temporally, such that, as an example, the officers can only permit a requester to view the company customer list during weekday business hours.

As further shown in FIG. 2, an event-based authenticator subsystem 28 receives internal system triggers to request, receive, and process user authentication events. A file viewer server subsystem 30 displays the contents of files contained in the data vault. A file content scanner subsystem 32 evaluates and classifies the contents of one or more files. A file malware scanner subsystem 34 evaluates one or more files for malware content as prescribed by suitable signature and algorithmic techniques, for example. An exfiltration control subsystem 38 controls and executes the exfiltration of files. A data vault repository subsystem 70 stores and retrieves files. A system event repository 72 stores and retrieves events for the system. It will be appreciated that the components described may be, but need not be, physically or electronically partitioned as standalone components. For example, all components may be provided as part of a single computer software program. Alternatively, the components may be provided as or on different computing systems.

Figure 3:
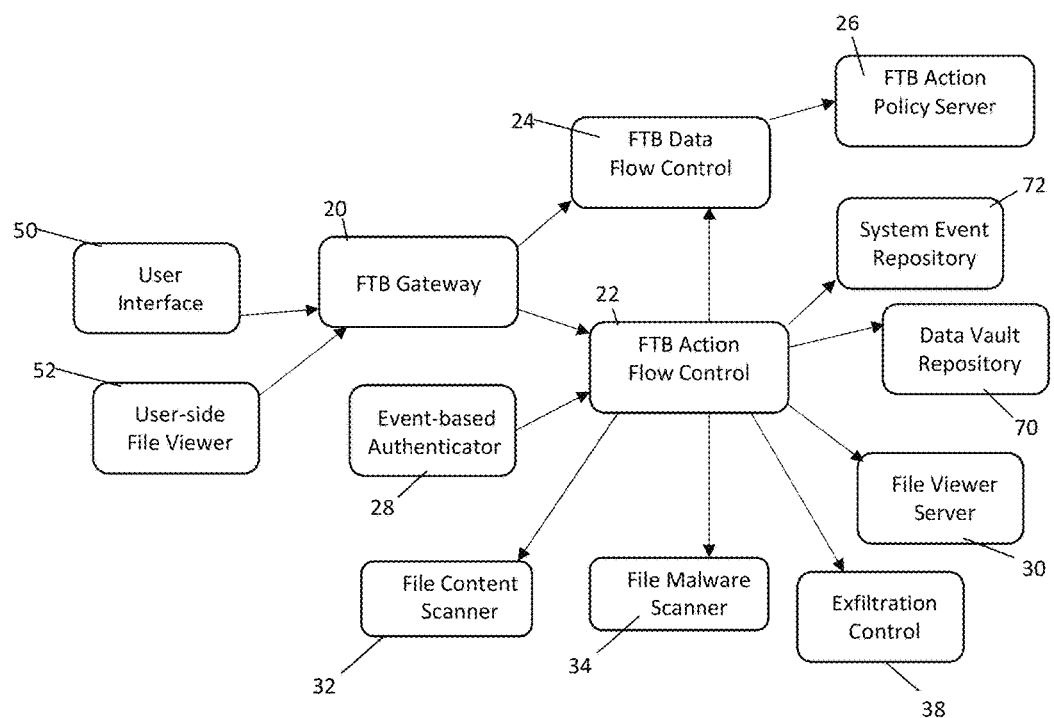

FIG. 3 provides a schematic diagram illustrating the various components of the system described herein with communication flows represented by arrows. A user interface 50 and user file viewer 52 can be used with the present system, but are not necessarily components or elements of the system described herein.

In various embodiments, the FTB gateway subsystem 20 operates on a computing system and provides secured access to host 21 from external networked systems that are apart from the FTB gateway network grouping or subnetwork. The FTB gateway subsystem 20 can provide access by enforcing one or more user authentication techniques, which can include, at a minimum, authentication codes and biometric data. In various embodiments, the FTB gateway subsystem 20 provides access using data access communications protocols including Hypertext Transport Protocol (HTTP), HTTP Secure (HTTPS), and Secure SHell (SSH) protocol, for example. Further, the FTB gateway subsystem 20 can restrict user actions after the user gains access via the access protocol by directing all user engagements to the FTB action flow control subsystem 22.

The FTB action flow control subsystem 22 operates on a computer system that is not required to operate on the same system as the FTB gateway subsystem 20, according to various implementations of the present system. For example, the FTB action flow control subsystem 22 need not include services for copying files out of the FTB gateway network grouping or subnetwork. The FTB action flow control subsystem 22 receives requests to perform actions within the system, restricts actions by obtaining restrictions from the FTB action policy server subsystem 26, and operates as a proxy for executing actions pertaining to the DVR 70, including file management operations such as, for example, listing files/folders, viewing file metadata, viewing file contents, navigating through the file system, and uploading, exporting, moving, deleting, searching, and modifying files.

In various embodiments, the FTB action flow control subsystem 22 operates as a proxy that does not provide for file copying out of the data vault repository 70. In this setting, should any command for copying a file be received by the FTB action flow control subsystem 26, the command will be denied. The FTB action flow control subsystem 22 can be separated from the data vault repository 70 by process, container, virtual machine, or system. In embodiments, the FTB action flow control subsystem 22 acts as a proxy that executes operations on the data vault repository 70 that are not permitted directly by a user or another process, thereby restricting data vault repository access. The FTB action flow control subsystem 22 can maintain defined action steps that may involve one or more different processes operating on different systems. The collection and order of action steps form a transaction. It will be appreciated that the FTB action flow control subsystem 22 can enforce a given transaction from start to finish, forming an assured transaction behavior. Any anomaly or violation for actions, order, or timing of actions that does not comply with the transaction can be detected, and the FTB action flow control subsystem 22 can rank order and report the severity of the anomaly. In various embodiments, the FTB action flow control subsystem 22 can deny the completion of the transaction after identifying an anomaly. In other aspects, the FTB action flow control subsystem 22 can reverse actions occurring prior to detecting the anomaly, effectively returning the affected system components to the system state immediately before the first action.

In various embodiments, the FTB data flow control subsystem 24 operates on a computer system that is not required to operate on the same system as the other components. The FTB data flow control subsystem 24 is assigned to monitor computing systems for user and process actions, considering rules to prevent outbound file copies for assigned computing systems. The FTB data flow control subsystem 24 also monitors user and process actions and actively prevents outbound file copy actions, reporting any violating action.

The event-based authenticator subsystem 28 operates on a computer system that is not required to operate on the same system as the other components. The event-based authenticator subsystem 28 receives requests identifying a username or usernames to authenticate, and then determines an authentication method corresponding to each username. Alternatively, the event-based authenticator subsystem 28 can receive requests identifying a username or usernames to authenticate and an authentication method assigned for the username or usernames. For instance, if a user is known to the system, such as the president of a company using the system, the system may have stored information such as the president's identify, means of contacting the president and authentication details, such as a user name, password, biometric characteristics, mobile phone number, e-mail address and other information. If the user is not known to the system, such as a new information requester, the system can prompt the user for identifying information and credential information to be used in authenticating the requester. The event-based authenticator subsystem 28 can execute the authentication method by communicating with a separate user device corresponding to the user who corresponds to the username account. The event-based authenticator subsystem 28 further receives an authentication reply from the user device, verifies the authentication and reports the results.

While other processes can be addressed, the present system provides secure services for, among other things, (1) uploading files, (2) listing files, (3) exporting files and (4) viewing files.

Figure 4:
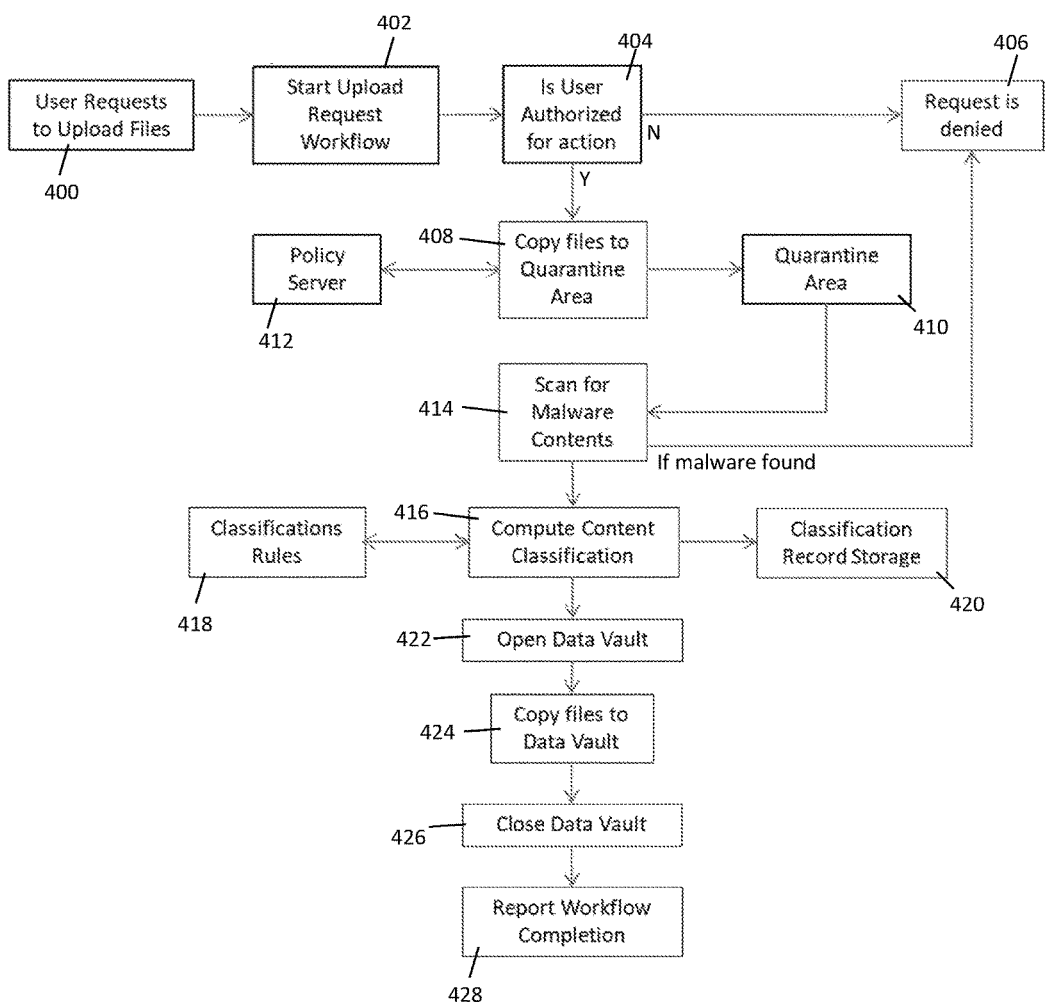
FIGS. 4 through 7 are exemplary flow diagrams in accordance with various embodiments of the present disclosure.

An exemplary process flow for uploading files is shown in FIG. 4. As shown therein, at 400, a user sends a request to upload a file to the system, and the time of the request can be noted. This request may come from a device 11, 12 or 13 as in FIG. 1. The FTB gateway subsystem 20 receives the request and the workflow processes for the upload request are begun, as at 402. The workflow process can be stored and accessed by FTB action flow control component 22. At 404, the system determines whether the user is authorized for the upload action. This step can be performed by the FTB action policy server 26 determining authorization based on a known or assessed attribute of the user. For example, if the user is included in a list of permitted users, has an appropriate credential or has an associated access level, the user may be authorized. If the user is not authorized, then the upload request is denied as at 406. If the user is authorized, then the file is securely received from the user and copied to a quarantine area as at 408 and 410, and such action can be performed by FTB data flow control component 24. The FTB data flow control receives the destination data vault directory from the user. The system may consult the policy server 26 as at 412 to assess the permission for the user to save to the destination data vault directory. The file malware scanner 34 can then scan the file for malware as at 414. If malware is found, the user's request is denied as at 406.

At 416, the content of the file can be evaluated and its classification can be computed. This step can be performed by file content scanner component 32. By evaluating the content, the system can assess the level of sensitivity of the file contents and can store information about the sensitivity classification of the file contents, as needed. In various embodiments, the file content scanner component 32 may consult classification rules as at 418 and store the classification detail as at 420. After the content evaluation steps, the system can then open the data vault repository 70 as at 422, copy the file(s) from the quarantine area to the data vault repository as at 424, close the data vault as at 426 and report workflow completion as at 428. In this way, data vault access is briefly opened and then closed, and does not remain open and vulnerable. The opening, copying and closing steps can be performed by the exfiltration control component 38 in various embodiments. The workflow completion step can be performed by the FTB data flow control component 24 reporting to the FTB action flow control component 22, for example. Also, all of the details of the requested and performed workflow steps can be stored in the system event repository 72.

Whether files are initially stored with the data vault, or uploaded and later stored with the data vault, the files can be provided with associated owners and permitted functions. For instance, data file A may have a single owner O and may be a view-only file, whereas data file B may have three owners W1, W2 and W3, and may be viewed, exported and copied. Such attributes may be stored with the data files when they are first stored and/or uploaded to the data vault repository 70.

Figure 5:
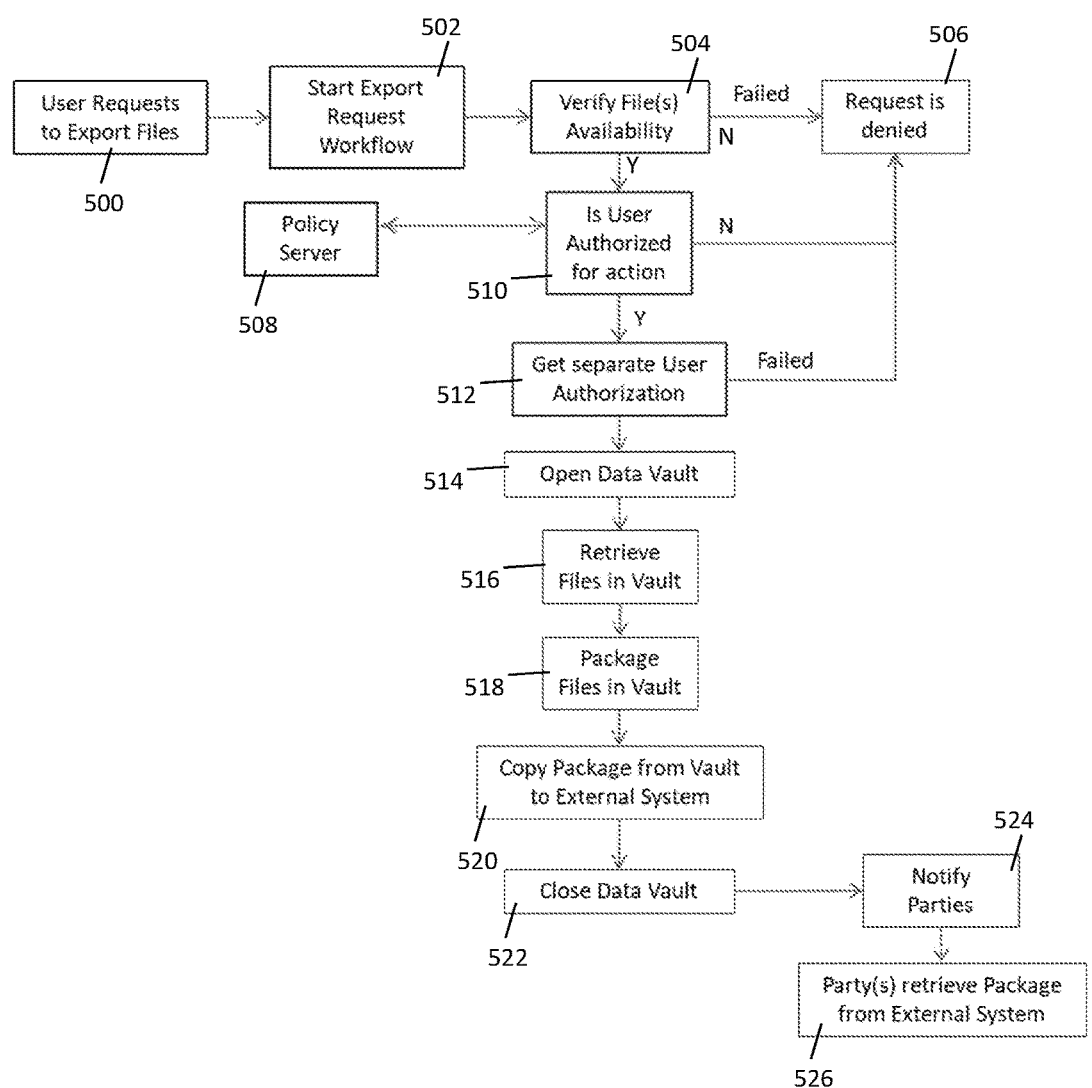

An exemplary process flow for exporting files is shown in FIG. 5. As shown therein, at 500, a user sends a request to export a file to the system. This request may come from a device 11, 12 or 13 as in FIG. 1, and the time of the request can be noted. The FTB gateway subsystem 20 receives the request and the workflow processes for the export request are begun, as at 502. The workflow process can be stored and accessed by FTB action flow control component 22. As at 504, the system verifies whether the requested file is available, and if not, the user's request is denied as at 506. At 508, if the requested file is available, the system then checks at 508 with the FTB action policy server 26 to assess whether the user is authorized to conduct the action, represented by 510. If the user is authorized, then the event-based authenticator subsystem 28 acts to obtain a separate user authentication as at 512. Such authentication can involve sending an electronic communication to a mobile device of the user requesting the file export, and obtaining appropriate credentials. Such credentials may be something the user has, something the user is, something the user knows or other credential. The credentials may be pre-established and internally verifiable by the system, and the credentials may be externally verifiable, such as the geolocation of the user's device at the time of the authentication request. If the user cannot provide the required authentication, the file export request is denied as at 506. If the user is authenticated, the system can then open the data vault repository 70 as at 514, retrieve the requested file(s) as at 516, package the file(s) in the vault as at 518, copy the package from the vault to an external system as at 520, close the data vault as at 522 and notify the proper parties as at 524. In notifying the appropriate parties, it will be appreciated that the requested file(s) will have one or more associated file owners. For example, if the requested file is the company's customer list from the above example, the file owners may be the officers of the company, for example. Ownership may be recorded with the host by identifying each owner of the file. Further, different file owners may be required to authenticate the requested transaction depending upon various factors, such as the type of request (e.g., view the file, export the file, etc.), the time of day or other temporal factor, the geolocation of the requester or owner, and other factors. If the president of the company is the only user who can approve a file export for the company list, then the president's authentication would be required in order for the file export to occur. Alternatively, if four different officers must approve a request to view the company's customer list, the four officers must provide authentication in order for the file to be viewed. Authentication can be obtained by communicating with a mobile communications device associated with the parties whose authentication is required, as described elsewhere herein. By requiring and providing for file owner authentication in these embodiments, the system disclosed herein provides a technical solution to problems of spoofing and compromised credentials that can otherwise make data and files vulnerable to cyber attacks.

Similar to the upload process, the data vault for a file export operation is briefly opened and then closed, and does not remain open and vulnerable. The opening, retrieving, packaging, copying, closing and notifying steps can be performed by the exfiltration control component 38 in various embodiments. It will be appreciated that the owner authentication processes can occur before or after the data vault repository is opened and the file retrieved and packaged as described above. Once the requested action is authenticated by the file owner(s), the requesting party is notified and can retrieve the file from the external system as at 526. The file can be protected on a secured server and is accessed by the requesting party through a secured channel. The file can further be encrypted for further protection. In various embodiments, the secured channel address and the password for the encrypted file are provided exclusively to the requesting party through a mobile message application and to the requesting party's assigned email. A workflow completion process can also be performed by the FTB data flow control component 24 reporting to the FTB action flow control component 22 that the export process has been completed, for example. Also, all of the details of the requested and performed workflow processes can be stored in the system event repository 72.

Figure 6:
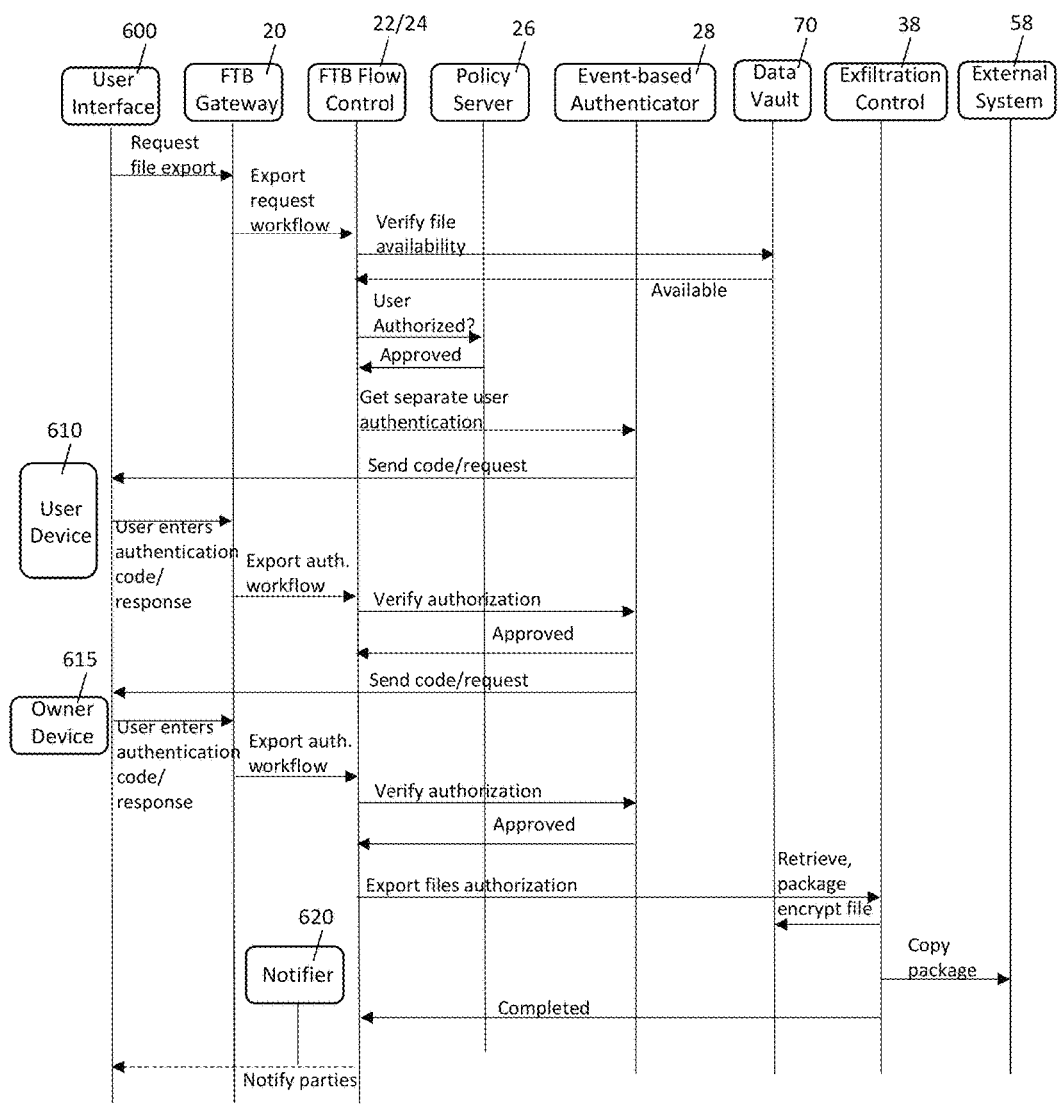

An exemplary process flow for activities assigned to subsystems for exporting files is illustrated in FIG. 6. As shown therein, a system graphical user interface (GUI) 600 is provided for a user of a user device (e.g., one of the devices 11, 12, 13 in FIG. 1) to request a file export. The user sends his or her export request to the system, and the FTB gateway component 20 receives the request and begins the workflow process. The time of the request can be noted, as the time may influence whether the requested action can be honored and/or which owner(s) must be contacted for approval. The FTB action flow control component 22 receives the workflow request, checks with the data vault repository 70 to assess whether the file is available, and checks with the FTB action policy server 26 to see whether the user is authorized. Assuming the user is authorized, the FTB data flow control component 24 checks with the event-based authenticator component 28 to ensure the requesting user can be properly authenticated, and the event-based authenticator component 28 generates an authentication code and a message. The event-based authenticator component 28 then sends the message to the user's device 610 in order to obtain proper authentication. The user device 610 that receives the message for authentication may or may not be the same as the device with GUI 600 used to make the initial request. If the user has proper authentication, such as a code, for example, the user can send the message and the code or other authentication response to the FTB gateway component 20 via device 610. At this point, the system can require further authentication by one or more owners of the requested file in order to export the file. In such event, the event-based authenticator component 28 then sends the message to the owner's device 615 in order to obtain proper authentication. The owner's device 615 is not the same device as user device 610 or requesting device with GUI 600. If the owner provides proper authentication, such as a code, information, biometric authentication, etc., the code or other authentication response is sent to the FTB gateway component 20 via device 615. The FTB gateway component 20 then instructs the FTB action flow control component 22 to run the export authentication workflow processes, after which the FTB action flow control component 22 seeks to verify the owner's code with the event-based authenticator component 28. If the code is authenticated, the event-based authenticator component 28 provides approval to the FTB action flow control component 22. The FTB gateway component 20 then sends the authorization to export files to the exfiltration control component 38, which retrieves, packages, copies and optionally encrypts the requested file(s), then copies the package to an external system 58 and notifies parties of the availability of the file(s). In various embodiments, a notifier component 620 associated with host 21 is employed for notifications. In these ways, the data vault is opened only after proper authentication and is closed immediately after the file is obtained for exporting.

Figure 7:
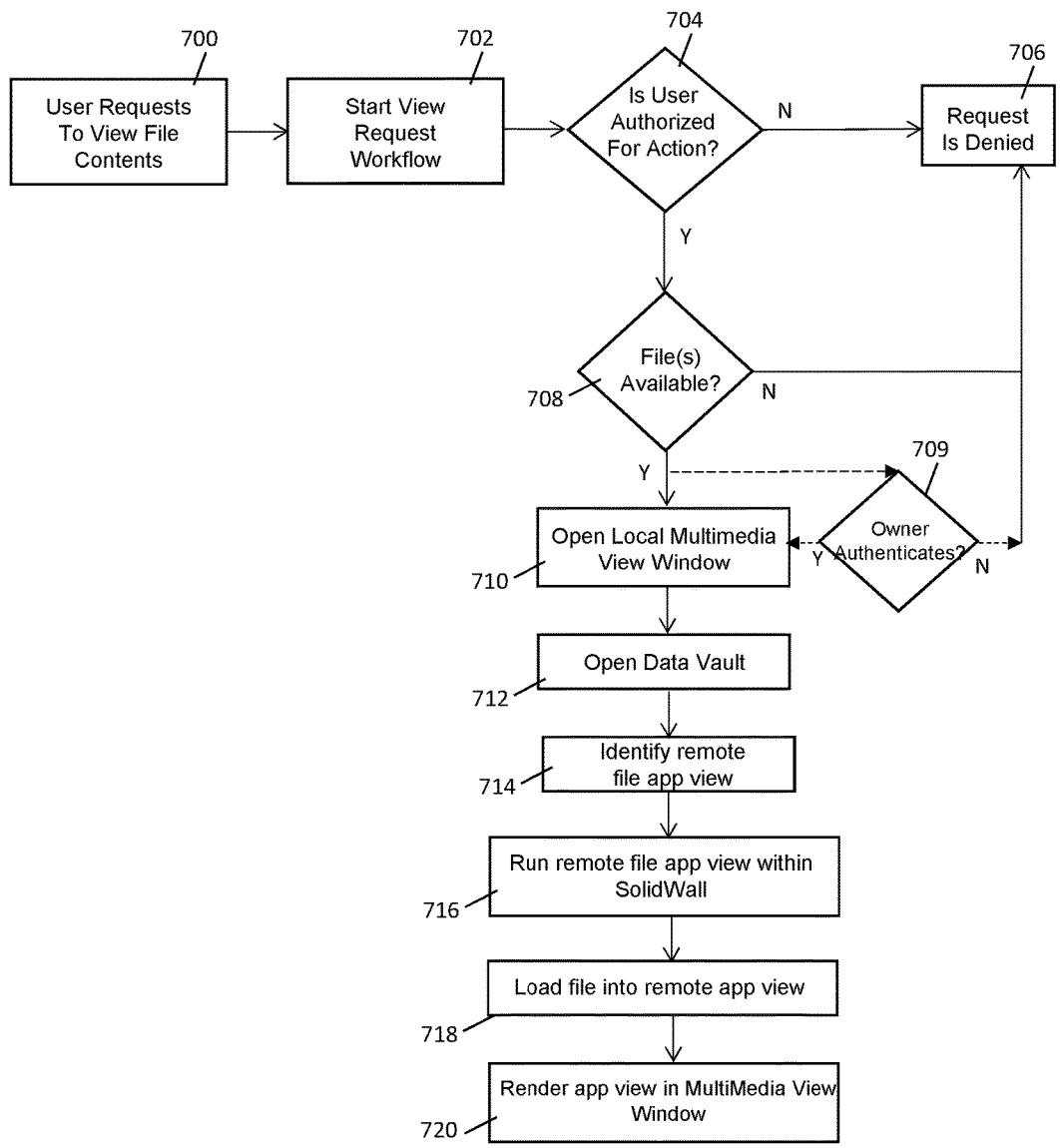

An exemplary process flow for viewing file content is shown in FIG. 7. As shown therein, at 700, a user sends a request to view a file to the system. This request may come from a device 11, 12 or 13 as in FIG. 1. The FTB gateway subsystem 20 receives the request and the workflow processes for the view request are begun, as at 702. The workflow process can be stored and accessed by FTB action flow control component 22. At 704, the system then checks with the FTB action policy server 26 to assess whether the user is authorized to conduct the action. If not, the request is denied as at 706. If the user is authorized, the system then verifies whether the requested file is available at 708. If not, the user's request is denied as at 706. If the file is available, the system opens a local multimedia view window for the user as at 710, opens the data vault as at 712, identifies the remote file application view as at 714, runs the remote file application view as at 716, loads the file into the remote file application view as at 718 and renders the file application view for the user as at 720. Also, all of the details of the requested and performed workflow processes can be stored in the system event repository 72. As described above in connection with file export processes, after the file is deemed available as at 708, the system can gain approval from a file owner to allow the requested file action, as shown in dashed lines at 709. If the owner approves, the process returns to 710. If the owner disapproves, the request is denied as at 706.

As used in the exemplary process descriptions above, the present system operates in a deny-by-default manner, assuming that any new requests for file manipulation (e.g., upload, export, view, etc.) must be validated before permitting the actions required for the request. Failed access attempts identified by the FTB action policy server or event-based authenticator result not only in access being denied and the vault remaining closed, but also result in such failed attempts being logged in the system event repository 72 and optionally reported to other vault owners, if they are assigned, who are responsible for the file. In all process flows, if it is determined that a user's device or credentials have been compromised, appropriate actions can be taken to isolate and deny any related requests. For example, a "kill" switch can be implemented that will immediately deny any requests related to or emanating from a mobile device that has been compromised, without any authentication steps involved.

The system of the present disclosure thus controls the blocking and/or transfer of secured files, incorporating authentication, data leak protection, and anti-virus protection as it manages the opening and closing of access and control ports.

In various aspects, the present system host 21 can analyze behaviors and commands. The very fact that the machine, server, software, or user is entering a command to the present system can be seen as a threat to the system. Even with pseudo-user permission and proper authentication (hacked or otherwise), any command is seen as improper and shut down. Innocent mistakes are made all the time by authorized users/admins. Bad actors can gain administrative rights and convince the system to elevate their authority or to trick the system into giving data to unauthorized systems or users. As described elsewhere herein, the present system identifies anomalous actions, challenges actions, and blocks actions that are not approved.

The secured container host 21 as described herein permits user applications to run in the secured cloud/enclave just as if the application were running on a desktop. Other aspects of the presently disclosed system include network and device segmentation protection, one-way transfer protection with bi-directional interaction, contained sharing, one-way secured and automated file synchronization and user and process action containment.

In various embodiments, an integration layer of the present system supports both a synchronous (blocking) and asynchronous (non-blocking) interaction between disparate software servers and technologies that enables an integration and orchestration of services for executing operations. The integration layer can use secured and authenticated data channels, forms segmented groups, and connects services in one-to-one, one-to-many, and many-to-many configurations. The integration layer can operate across virtual machines (VMs) in a distributed computing and messaging architecture, for example.

In various embodiments, the present system provides for intelligent security handling by providing a streamlined way to prevent data exfiltration. This saves users time, money and resources compared to other methods. The system assumes the posture that networks will be compromised by an attacker and, therefore, focuses on blocking all the exits so that data cannot be escaped. The system can intercept, halt, and analyze one or more user or process actions that are exercised over a network. In various embodiments, the present system operates in real-time and prevents data exfiltration without the proper authentication procedure described herein.

As described above, mobile communications devices can be employed during processes described herein. Unlike indirect alerts, such as to an employer's information technology department, the present disclosure contemplates direct communications with a user device for authentication purposes. For example, to prevent unauthorized actions including data exfiltration, an authentication mobile application associated with the present system instantly alerts the user's device (e.g., an Android™ or Apple™ device) to authenticate their identity and verify their intention to download data, such as sensitive data stored in the data vault 70. It will be appreciated that this process does not require an intermediary such as the IT department to relay this alert. This temporarily suspends data manipulation attempts automatically until the requesting user has been authenticated and vault owners for that data, if assigned, approve the user's request. In various embodiments, the authentication mobile application is built using the Google Authentication Technology™ that is supported globally by Google™ and optionally involves random number codes generated and sent by the system to the involved users who must provide the codes through their mobile or remote device.

As described above, the event-based authentication subsystem 28 provides detection for anomalous user actions in addition to uncovering violations of established security and usage policies. After the detection, the event-based authentication subsystem 28 can challenge the user using an out-of-channel request to the user's mobile or computing device. Based on various conditions and policies stored with the host 21, the system engages the event-based authentication subsystem 28 to compute and determine the challenge for the user for an approval using one or many authentication modalities. Thus, when an attacker performs an action and a challenge is activated through an out-of-channel request, if the attacker cannot reply, for example through the user's mobile device, then the action will be denied. If the attacker managed to obtain the user's mobile device, the action may require other vault owners to approve the action and hence they can issue the denial.

In various embodiments, a content analysis engine can work in conjunction with the event-based authentication subsystem 28 to monitor and flag trending and potentially harmful user behavior. The content analysis engine can block available and readable data flow containing credit card numbers, social security numbers or sensitive information, for example. This enables the present system to provide data security for policies that involve the control of data content in addition to ownership described herein.

It will be appreciated that a system in accordance with the present disclosure provides a technical solution to the challenge of secure file operations in electronic networks. The system can be provided as a computer-based system, where the components can be implemented in hardware, software, firmware, or combinations thereof, as illustrated in FIG. 1, for example. It will be appreciated that access can be provided over a public or private network 15, including the Internet, in various embodiments of the present invention. Further, external systems 58 (see FIG. 1) can be accessed via the present system for temporary storage of files, for example, as described elsewhere herein.

The above-described embodiments of the present disclosure may be implemented in accordance with or in conjunction with one or more of a variety of different types of systems, such as, but not limited to, those described below.

The present disclosure contemplates a variety of different systems each having one or more of a plurality of different features, attributes, or characteristics. A "system" as used herein refers to various configurations of: (a) one or more secured container hosts; and (b) one or more personal computing devices, such as desktop computers, laptop computers, tablet computers, personal digital assistants, mobile phones, and other mobile computing devices.

Thus, in various embodiments, the system of the present disclosure includes: (a) one or more computing devices in combination with one or more secured container hosts; (b) one or more personal computing devices, and one or more secured container hosts, alone, or in combination with one another; (c) a single secured container host; and/or (d) a plurality of secured container hosts in combination with one another.

In certain embodiments in which the system includes a personal computing device in combination with a secured container host, the secured container host is any suitable computing device (such as a server) that includes at least one processor and at least one memory device or data storage device. As further described herein, the personal computing device includes at least one processor configured to transmit and receive data or signals representing events, messages, commands, or any other suitable information between the personal computing device and the secured container host. The processor of the personal computing device is configured to execute the events, messages, or commands represented by such data or signals in conjunction with the operation of the personal computing device. Moreover, the processor of the secured container host is configured to transmit and receive data or signals representing events, messages, commands, or any other suitable information between the secured container host and the personal computing device. The processor of the secured container host is configured to execute the events, messages, or commands represented by such data or signals in conjunction with the operation of the secured container host.

In embodiments in which the system includes a personal computing device configured to communicate with a secured container host through a data network, the data network is a local area network (LAN), a wide area network (WAN), a public network such as the Internet, or a private network. The secured container host and the personal computing device are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium.

It will be appreciated that any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing, including a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

It will be appreciated that all of the disclosed methods and procedures herein can be implemented using one or more computer programs or components. These components may be provided as a series of computer instructions on any conventional computer-readable medium, including RAM, SATA DOM, or other storage media. The instructions may be configured to be executed by one or more processors which, when executing the series of computer instructions, performs or facilitates the performance of all or part of the disclosed methods and procedures.

Unless otherwise stated, devices or components of the present disclosure that are in communication with each other do not need to be in continuous communication with each other. Further, devices or components in communication with other devices or components can communicate directly or indirectly through one or more intermediate devices, components or other intermediaries. Further, descriptions of embodiments of the present disclosure herein wherein several devices and/or components are described as being in communication with one another does not imply that all such components are required, or that each of the disclosed components must communicate with every other component. In addition, while algorithms, process steps and/or method steps may be described in a sequential order, such approaches can be configured to work in different orders. In other words, any ordering of steps described herein does not, standing alone, dictate that the steps be performed in that order. The steps associated with methods and/or processes as described herein can be performed in any order practical. Additionally, some steps can be performed simultaneously or substantially simultaneously despite being described or implied as occurring non-simultaneously.

It will be appreciated that algorithms, method steps and process steps described herein can be implemented by appropriately programmed computers and computing devices, for example. In this regard, a processor (e.g., a microprocessor or controller device) receives instructions from a memory or like storage device that contains and/or stores the instructions, and the processor executes those instructions, thereby performing a process defined by those instructions. Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on a user's computer, partly on a user's computer, as a stand-alone software package, partly on a user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Where databases are described in the present disclosure, it will be appreciated that alternative database structures to those described, as well as other memory structures besides databases may be readily employed. The drawing figure representations and accompanying descriptions of any exemplary databases presented herein are illustrative and not restrictive arrangements for stored representations of data. Further, any exemplary entries of tables and parameter data represent example information only, and, despite any depiction of the databases as tables, other formats (including relational databases, object-based models and/or distributed databases) can be used to store, process and otherwise manipulate the data types described herein. Electronic storage can be local or remote storage, as will be understood to those skilled in the art. Appropriate encryption and other security methodologies can also be employed by the system of the present disclosure, as will be understood to one of ordinary skill in the art.

The invention claimed is:

1. A system, comprising:
a processor;
a memory storing instructions that, when executed by the processor, cause the processor to perform operations comprising:
storing a secure file in a data vault repository;
establishing file ownership for the secure file;
receiving a file manipulation request for the secure file from a requester at a determined time;
determining whether the requester is authorized for the file manipulation request;
upon determining the requester is authorized for the file manipulation request, issuing an authentication challenge to the requester;
upon receiving a positive response to the authentication challenge, determining a first file owner from a plurality of file owners to approve the file manipulation request based on the determined time, and issuing an approval request to the first file owner via a network; and
upon receiving a positive response to the approval request from the first file owner via the network, processing the file manipulation request.

2. The system of claim 1, wherein determining whether the requester is authorized is based on an attribute of the requester and the determined time.

3. The system of claim 1, wherein issuing the authentication challenge to the requester comprises communicating the authentication challenge to a mobile communications device.

4. The system of claim 1, wherein issuing the approval request to the first file owner comprises communicating the approval request to a mobile communications device.

5. The system of claim 1, wherein issuing the approval request comprises issuing an approval request to each of the plurality of file owners, and wherein receiving the positive response to the approval request comprises receiving a positive response from each of the plurality of file owners.

6. The system of claim 1, wherein processing the file manipulation request comprises opening the data vault repository, conducting the file manipulation request for the secure file and closing the data vault repository.

7. The system of claim 1, further comprising establishing one or more permitted file manipulation actions associated with the secure file.

8. A method, comprising:
storing, by a host, a secure file in a data vault repository;
establishing, by the host, a file ownership for the secure file;
receiving, by the host, a file manipulation request for the secure file from a requester at a determined time;
in response to receiving the file manipulation request, determining, by the host, that the requester is authorized for the file manipulation request;
in response to determining that the requester is authorized for the file manipulation request, issuing, by the host, an authentication challenge to the requester;
receiving, by the host, a positive response to the authentication challenge;
in response to receiving a positive response to the authentication challenge,
determining a first file owner from a plurality of file owners to approve the file manipulation request based on the determined time, and issuing, by the host, an approval request to the first file owner via a network;
receiving, by the host, a positive response to the approval request from the first file owner via a network; and
in response to receiving the positive response to the approval request from the first file owner, processing, by the host, the file manipulation request via the network.

9. The method of claim 8, wherein determining that the requester is authorized is based on an attribute of the requester and the determined time.

10. The method of claim 8, wherein issuing the authentication challenge to the requester comprises communicating the authentication challenge to a mobile communications device.

11. The method of claim 8, wherein issuing the approval request to the first file owner comprises communicating the approval request to a mobile communications device.

12. The method of claim 8, wherein issuing the approval request comprises issuing an approval request to each of the plurality of file owners, and wherein receiving the positive response to the approval request comprises receiving a positive response from each of the plurality of file owners.

13. The method of claim 8, wherein processing the file manipulation request comprises opening the data vault repository, conducting the file manipulation request for the secure file and closing the data vault repository.

14. The method of claim 8, further comprising establishing one or more permitted file manipulation actions associated with the secure file.

15. A system, comprising:
a processor;
a memory storing instructions that, when executed by the processor, cause the processor to perform operations comprising:
receiving a file manipulation request for a secure file from a requester at a determined time;
establishing file ownership for the secure file;
in response to receiving the file manipulation request, determining whether the requester is authorized or is not authorized for the file manipulation request;
upon determining the requester is not authorized for the file manipulation request, denying the file manipulation request;
upon determining the requester is authorized for the file manipulation request, issuing an authentication challenge to the requester;
upon receiving a negative response to the authentication challenge, denying the file manipulation request;
upon receiving a positive response to the authentication challenge, determining a first file owner from a plurality of file owners to approve the file manipulation request based on the determined time, and issuing an approval request to the first file owner via a network;

upon receiving a negative response to the approval request from the first file owner, denying the file manipulation request; and upon receiving a positive response to the approval request from the first file owner via the network, processing the file manipulation request.

16. The system of claim 15, wherein issuing the approval request comprises issuing an approval request to each of the plurality of file owners, and wherein receiving the positive response to the approval request comprises receiving a positive response from each of the plurality of file owners.

17. The system of claim 15, wherein issuing the authentication challenge to the request comprises communicating the authentication challenge from a host to a mobile communications device associated with the requester.

18. The system of claim 15, wherein issuing the approval request to the first file owner comprises communicating the approval request from a host to a mobile communications device associated with the first file owner.

19. The system of claim 15, wherein issuing the authentication challenge to the request comprises communicating the authentication challenge from a host to a first mobile communications device, wherein issuing the approval request to the first file owner comprises communicating the approval request from a host to a second mobile communications device, and wherein the first mobile communications device is different from the second mobile communications device.

20. The system of claim 15, wherein processing the file manipulation request comprises opening a data vault repository, conducting the file manipulation request for the secure file and closing the data vault repository.

* * * * *